May 12, 1942.  T. R. HARRISON  2,283,059
CONTROL INSTRUMENT
Filed May 20, 1939  3 Sheets-Sheet 2

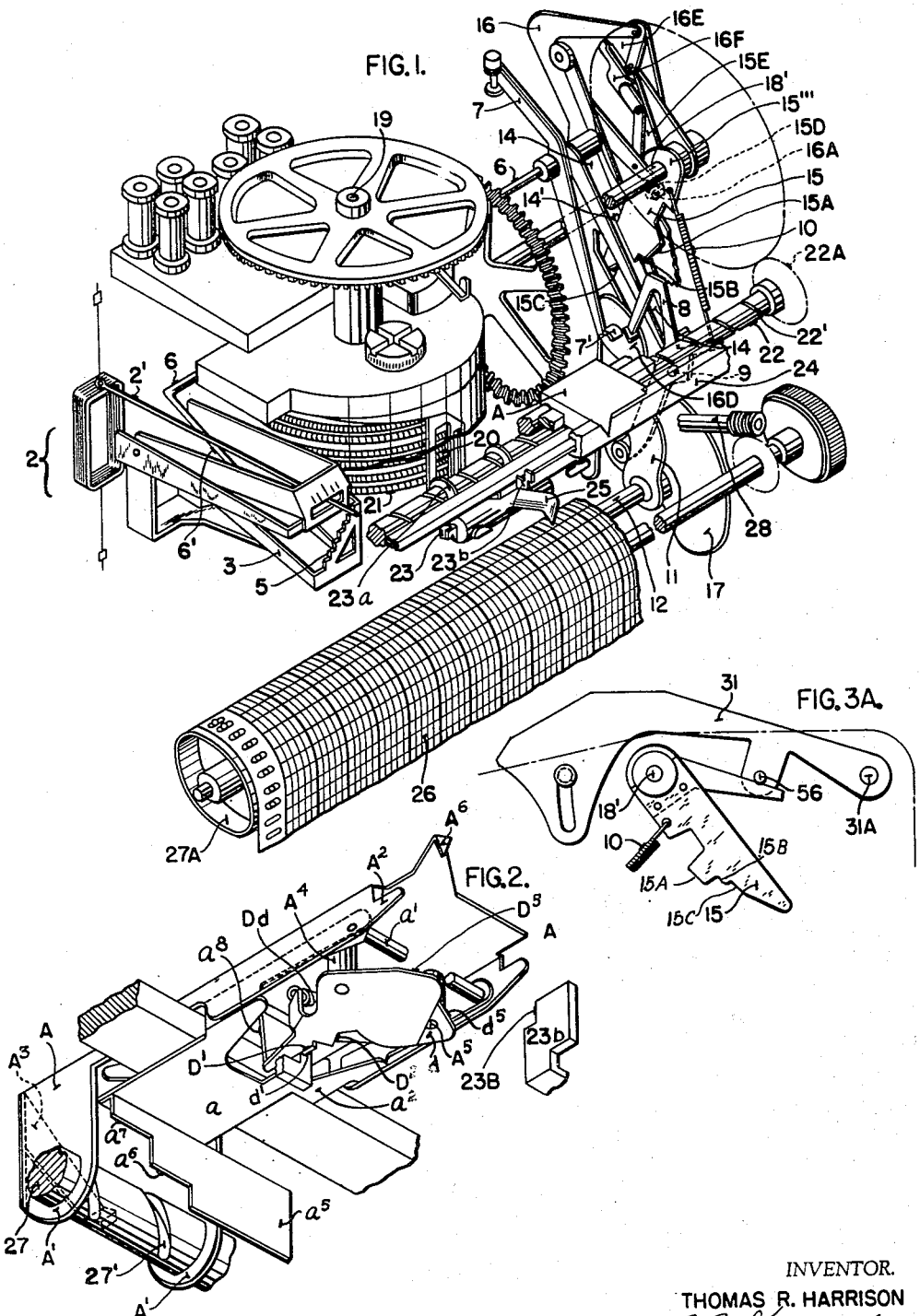

INVENTOR
THOMAS R. HARRISON
BY
ATTORNEY

INVENTOR.
THOMAS R. HARRISON
BY George W. [signature]
ATTORNEY

Patented May 12, 1942

2,283,059

UNITED STATES PATENT OFFICE 2,283,059

CONTROL INSTRUMENT

Thomas R. Harrison, Wyncote, Pa., assignor to The Brown Instrument Company, Philadelphia, Pa., a corporation of Pennsylvania Application May 20, 1939, Serial No. 274,855

8 Claims. (Cl. 236—70)

The present invention relates to control instruments and more particularly to a two position type of controller which gives an anticipating effect to the control action so that the value of the controlled condition is kept almost exactly at some desired amount.

It is an object of my invention to provide a control mechanism that is simple and direct in action which will give a desirably constant control characteristic to the condition being regulated.

It is a further object of my invention to provide a control mechanism that will, in effect, anticipate changes of the value of the condition being controlled from some desired value, and actuate a mechanism to maintain the condition at that point.

In the ordinary type of on-off control a supply of fuel to a heater, for example, is turned off when the temperature of the heater reaches some desired point and is turned on when the temperature drops to that point. This type of control, while suitable for some installations, has the undesirable characteristics of appreciably overshooting the control point in both directions since the heat supply is not altered until the control point is reached. If some means is provided to anticipate the deviation of the value of the condition from the control point, this means may be utilized in connection with the regular control apparatus to maintain the condition much nearer to the desired value than would otherwise be possible.

In my invention I provide a member that is responsive to the trend of the condition under control which cooperates with the regular on-off control mechanism to inject into the control an anticipating effect.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a perspective view of a potentiometer mechanism;

Fig. 2 is a perspective view of the control table used on the potentiometer;

Fig. 3A is a detail view of some of the levers used in the invention;

Figure 3:
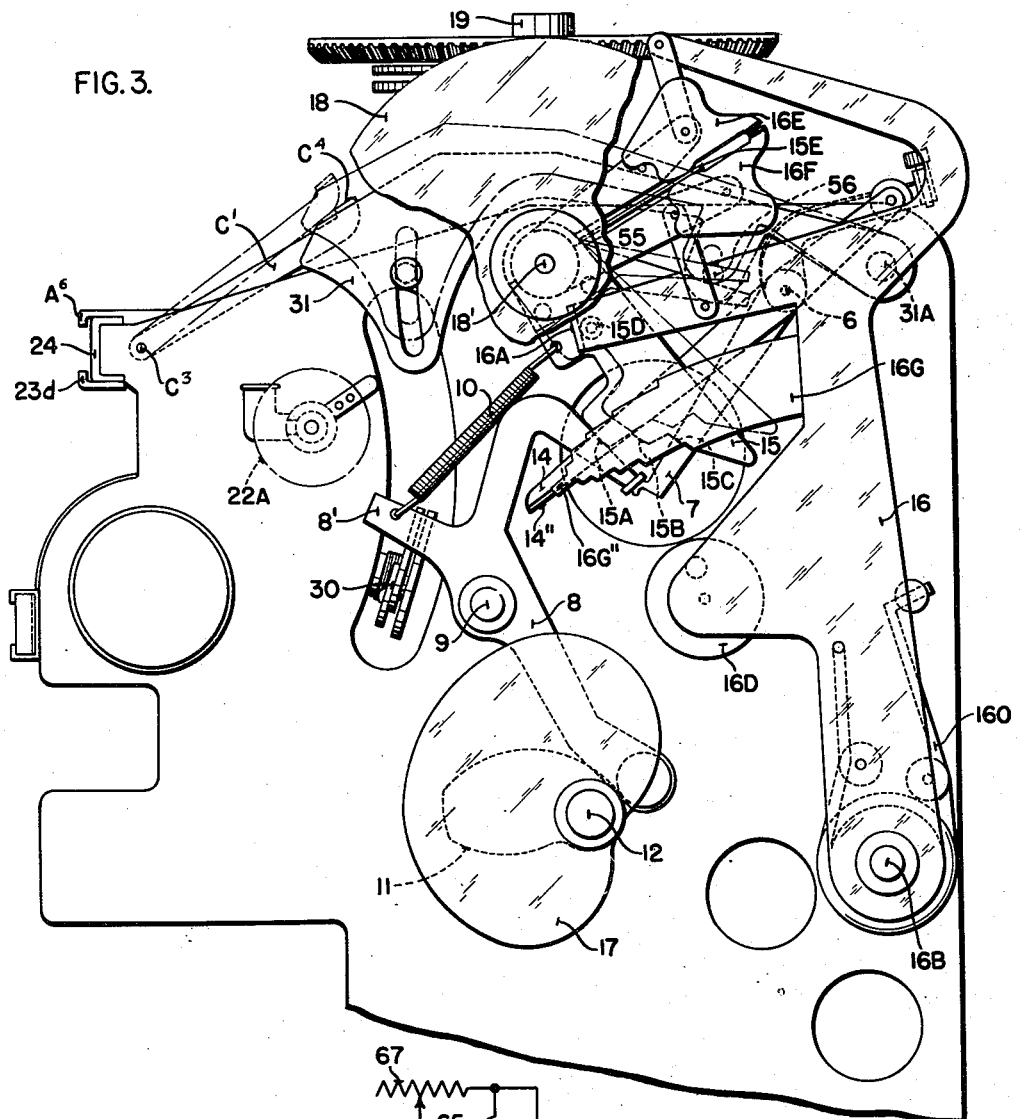
Fig. 3 is a view of a side plate of the instrument looking from the right in Figure 1.

The recording potentiometer instrument shown in perspective in Fig. 1, and significant operative parts of which are illustrated in Fig. 1, includes an galvanometer 2, the pointer 2' of which deflects in response to a condition of unbalance in the potentiometer measuring circuit, which may be any well known form including the resistance 21 which may be adjusted to rebalance the potentiometer. The instrument also comprises mechanical relay provisions operated by a constantly rotating driving motor (not shown) and controlled by the deflection of the galvanometer pointer 2' away from its normal zero position, to periodically rebalance the potentiometer circuit and move a pen or other recorder carriage 23 along a travelling record strip 26 to record the varying value of the quantity measured on said strip.

In respect to its recording potentiometer functions, the instrument shown is of the form disclosed in Patent No. 1,946,280, dated February 6, 1934, by Thomas R. Harrison, and in respect to the type of control mechanism employed herein, I make use of certain instrumentalities to be later disclosed.

The control provisions which, in their construction and arrangement, and in their combination with the above-mentioned rebalancing and carriage adjusting and control mechanism, constitute the features of the present invention, include a control table A, and means by which a control switch is actuated by said mechanism when the recorder carriage 23 is displaced in one direction or the other from the control table. The control table is normally stationary but may be manually adjusted along the path of movement of the carriage 23. The position of the control table along said path corresponds to, and determines the normal value of the quantity being measured, while the position, at any instant, of the carriage 23 corresponds to, and constitutes a measure of, and current value of said quantity.

The mechanism of the instrument of Fig. 1 through which the deflection of the galvanometer pointer 2' controls the adjustments of the recorder carriage 23 and the rebalance of the potentiometer circuit on a variation in the quantity or value measured by the galvanometer comprises a pointer engaging and position gauging element 3. The latter is pivotally supported and, in connection with the hereinafter mentioned shaft 6, has a loading tendency which may well be due partly to spring and partly to gravital action, to turn upward into the position in which one or another of the shoulders 5 of the member 3 engage the pointer 2'. The element 3 is engaged by, and turns with the arm 6' of a rock shaft 6. A spring 10 tends to hold a rocker 8, which is journaled on a pivot 9, in the position in which the rocker engages an arm 7 secured to the shaft 6, and thereby holds the latter in a position in which the shoulders 5 are all below the pointer 2'.

A cam 11, which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2'. The shoulders 5 are so arranged that the turning movement of the shaft 6 and arm 7, thus permitted, will be greater or less according to the deflective position of the pointer 2' at the time. When the arm 7 thus turns counter-clockwise, a lateral projection 7' of that arm engages and turns a secondary pointer element 14 into a position corresponding to the then deflection of the pointer 2'. The secondary pointer 14 is loosely journaled on the shaft 6, and has a gravitational loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15A, 15B and 15C of a locking member 15 engages the bottom wall of a slot 14' in the member 14, and thereby frictionally holds the latter in the position occupied by it when such engagement occurs. When the pointers 2' and 14 occupy their neutral positions, the shoulder 15B of the member 15 comes into locking engagement with the member 14. When the galvanometer pointer 2' has deflected to the right as seen in Fig. 1, as it does when the actual value of the quantity measured is lower than that indicated by the previously made and still existing potentiometer adjustment, the secondary pointer 14 is engaged and locked by the shoulder 15C. When the galvanometer pointer deflects in the opposite direction from its neutral position, as it does when the actual value of the quantity measured is higher than that indicated by the existing potentiometer adjustment, the pointer 14 is engaged and locked by the shoulder 15A of the member 15. The locking part 15 is given a tendency to move into locking engagement with the secondary pointer 14 by the spring 10, but is periodically held out of such engagement by the action on its projection 15D of the projection 16A carried by a ratchet lever 16 pivoted at 16B.

A spring 160 gives the lever 16 a tendency to turn forward in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupied when the galvanometer pointer 2 is in its neutral position.

The position assumed by the part 15, when in locking engagement with the secondary pointer 14, controls the action of the pawls 16E and 16F by virtue of the fact that the collar or hub portion 15''' of the part 15 carries a spring pawl engaging arm 15E. The movement of the locking part 15 into position in which its shoulder 15A engages the secondary pointer 14 causes the arm 15E to move the pawl 16E into operation engagement with the teeth of the ratchet wheel 18, and the clockwise or forward movement of the ratchet lever 16 then gives a clockwise adjustment to the ratchet wheel. Conversely, when the part 15 moves into the position in which its shoulder 15C engages the secondary pointer 14, the arm 15E shifts the pawl 16F into operative engagement with the wheel 18, and the latter is then adjusted in the counterclockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14, and thereby arrest the forward movement of the ratchet lever 16. In the neutral position of the galvanometer pointer and secondary pointer 14, the projection 14'' of the latter engages the central shoulder 16G'' of the arm 16G and the lever 16 is then held against any operative movement in the clockwise direction. When the secondary pointer position is more or less to one side or the other of its neutral position, the portion 14'' engages an upper or lower shoulder more or less distant from the central shoulder 16G'', and the lever 16 is then permitted more or less forward movement.

The rotation of the wheel 18 in one direction or the other effects corresponding potentiometer rebalancing adjustments and position adjustments of the recorder carrier 23. The rebalancing adjustments are affected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that teeth of the wheel 18 are in mesh with the teeth of a gear 22a carried by a carriage adjusting shaft 22 which is formed with a thread groove 22' of coarse pitch which receives a cam or mutilated screw thread rib secured to the carriage 23, so that the latter is moved longitudinally of the shaft 22 as the latter is rotated.

The marker carriage 23 comprises a frame portion formed of a single piece of sheet metal cut and bent to form a flat underbody portion transverse to and through which the shaft 22 extends, two projections 23b, one at each front corner of said body portion which bear against the inner edge and upper side of the lower flange of a channel bar or rail 24 forming part of the instrument framework, and a projection terminating in roller 23c which extends in a vertical plane transverse to the shaft 22 and rail 24. In addition, the body portion of the carriage frame is provided with a forwardly extending tongue passing beneath the rail 24 and terminating in an uprising pointer or index 23d, adapted to cooperate with a scale fastened to the front face of the rail 24 to indicate the position of the pen carriage and the value of the quantity measured and recorded by the instrument.

The record sheet 26 passes over and is given feeding or advancing movements by a record feedroll 27A. The latter is intermittently rotated by means of a worm and screw connection between the shaft of the roll 27A and a transverse shaft 28. Shaft 28 is intermittently actuated by means of a ratchet and lever device 30 which is engaged and oscillated by the arm 8' of the rocker 8 on each oscillation of the latter.

The control table A of the instrument shown in Figs. 1 and 2 comprises a sheet metal frame having ear portions A' apertured for the passage of the shaft 27 mounted in the instrument framework alongside the shaft 22, and having bearing parts $A^2$ which engage and slide along the upper flange of the rail 24. To facilitate the adjustment of the control table A along the path of travel of the pen carriage 23, the shaft 27 is shown as formed with a thread groove 27' which is adapted to receive a cam or mutilated thread rib part that may be secured to the control table frame. The shaft 27 may be rotated to adjust the control table in any suitable manner, as by means of a transverse shaft geared to the shaft 27 and rotated by an operating handle or knob at the front of the instrument. An index $A^6$ in conjunction with a scale on the front face of the rail 24 may indicate the adjustment of the table and the corresponding normal value of the quantity measured.

A member $a$ is hinged at one edge to the frame of the control table A by a pivot or pintel shaft $a'$ extending parallel to the shaft 27. The member $a$ is formed with guiding provisions including a part $a^3$ for a bar-like part C which extends parallel to the shaft 27 and is rigidly secured at its ends to arms C' at opposite ends of the instrument which are pivotally connected at $C^3$ to the instrument framework, so that the yokelike structure formed by the bar C and arms C' may turn with respect to the instrument framework about an axis coinciding with that of the hinge connection $a'$, between the table A and part $a$. The part $a$ and bar C are held by the said guiding provisions against independent turning movement about the axis of their respective pivotal supports. The part $a$ and bar C have a gravital tendency to move from their highest positions, shown in Fig. 2, counter-clockwise into or toward their lowermost positions. Their movement downward below their last-mentioned position is prevented by the engagement of a projection $C^4$ from the arm C' with an adjacent portion of the instrument framework or with a part 31, to be described. The extent to which the parts $a$ and C are permitted to swing downwardly from their uppermost positions depends upon the relative positions of the table A and the recorded carriage 23. When the value of the quantity measured is so low that the carriage 23 is entirely at the low side (left-hand side as seen in Fig. 1) of the control table A, the carriage 23 permits movement of the parts $a$ and C to their lowest position. When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. When an increase in the quantity measured results in a movement of the recorder carriage 23 to the high side of the control table A, that movement causes the part $a$ to be positively secured against down movement from its uppermost position by adjusting a latch member into its latching position. The manner of accomplishing this will now be described.

The part $a$ has a carriage engaging portion $a^5$ secured to it, as shown in Fig. 2, which is formed with steps $a^6$ and $a^7$ that are adapted to be engaged by the roller 23c on carriage 23. For a normal value of the quantity being measured, the roller 23c is positioned approximately at the edge between steps $a^6$ and $a^7$, and as its value becomes lower, the carriage 23 is moved to the left, thus permitting part $a$ and its attached bar C to be lowered around $a'$ as a center. As the value of the measured quantity increases, the carriage 23 moves to the right. A latch D on table A secures the part $a$ in its upper position. The latch D (see Fig. 2) is pivotally mounted on a stud $A^4$ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud $A^5$ depending from the underside of the control table frame alongside the stud $A^4$, and a spring D$d$ connecting the members D and $d$. The spring D$d$ tends to move the member D in the counter-clockwise direction, as seen in Fig. 2, and to move the member $d$ in the opposite direction about their respective pivotal supports $A^4$ and $A^5$; such turning movements of the members D and $d$ are prevented by the engagement of the finger portion $d'$ of the part $d$ with the shoulder D' of the member D, when the latter is in its latching position, as shown in Fig. 2. In the non-latching position of the member D, the finger $d'$ engages a shoulder $D^2$ of the part D.

The members D and $d$ are moved from the latched position shown in Fig. 2 into the unlatched position and back again into the position shown in Fig. 2 by the engagement of the recorder carriage shoulder 23B with the cam shaped front edges $D^5$ and $d^5$ of the members D and $d$, respectively. The edges $D^5$ and $d^5$ are so respectively shaped and disposed that as the carriage moves to the high side of the control table, the shoulder 23B acts on the edge $d^5$ to turn the member $d$ counter-clockwise, as seen in Fig. 2, so that the spring D$d$ may then move the member D into its latching position in which its shoulder D' engages the finger $d'$. When the carriage 23 subsequently moves back from its high position, the shoulder 23B engages edge $D^5$ of the member D and moves the latter into its non-latching position while permitting the spring D$d$ to move the member $d$ into the position in which its finger $d'$ engages the shoulder $D^2$ of the member D and holds the latter in its non-latching position.

The parts $a$ and C are positively held in their uppermost positions by the action of a spring 32, except during the portion of each revolution of the shaft 12 when the cam 11 renders the spring 32 inoperative to prevent such movement, as is hereinafter described. The extent to which the parts $a$ and C are permitted to swing downwardly from their uppermost positions during each period when the action of the cam 11 renders the spring 32 temporarily inoperative, depends upon the then relative positions of the table A and the recorder carriage 23. When the value of the quantity measured is low enough so that the carriage 23 is entirely at the low side (left-hand side as seen in Fig. 1) of the control table A, the carriage 23 does not interfere with the movement of the parts $a$ and C into their lowermost positions.

When the current value of the quantity measured is suitably close to the normal value of the quantity, the control table A and marker carriage 23 are in such relative positions that downward movement of the part $a$ is restricted by the engagement of one of the steps $a^6$ or $a^7$ with the roller 23c of the pen carriage.

The means through which the spring 32 normally prevents movement of the control table part $a$ out of its clearance position, and through which the rising and falling movements of the bar C and part $a$ effect control functions, include a floating member 33 connected by a link 34 to the arm C', and parts associated with the member 33. The latter is pivotally connected at 35 to the part 36 of a compound lever comprising parts 36 and 37 each pivoted to the instrument framework at 38 and normally held against relative movement by a spring 39. The latter tends to hold the part 36 in engagement with a projection 40 of the part 37, but serves as a safety device which may yield to prevent injury of the parts in case the switch parts actuated by the member should jam. The spring 32 extends between the upper end of the lever part 37 and the instrument framework, and tends to hold the parts 36, 37 and 33 in the positions shown in dotted lines in Fig. 4. The lever part 37 is moved from the dotted line position into the full line position of Fig. 4 once during each rotation of the shaft 12, by the cam 11, which then engages a cam roll follower 41 carried by the lever part 37.

Figure 4:
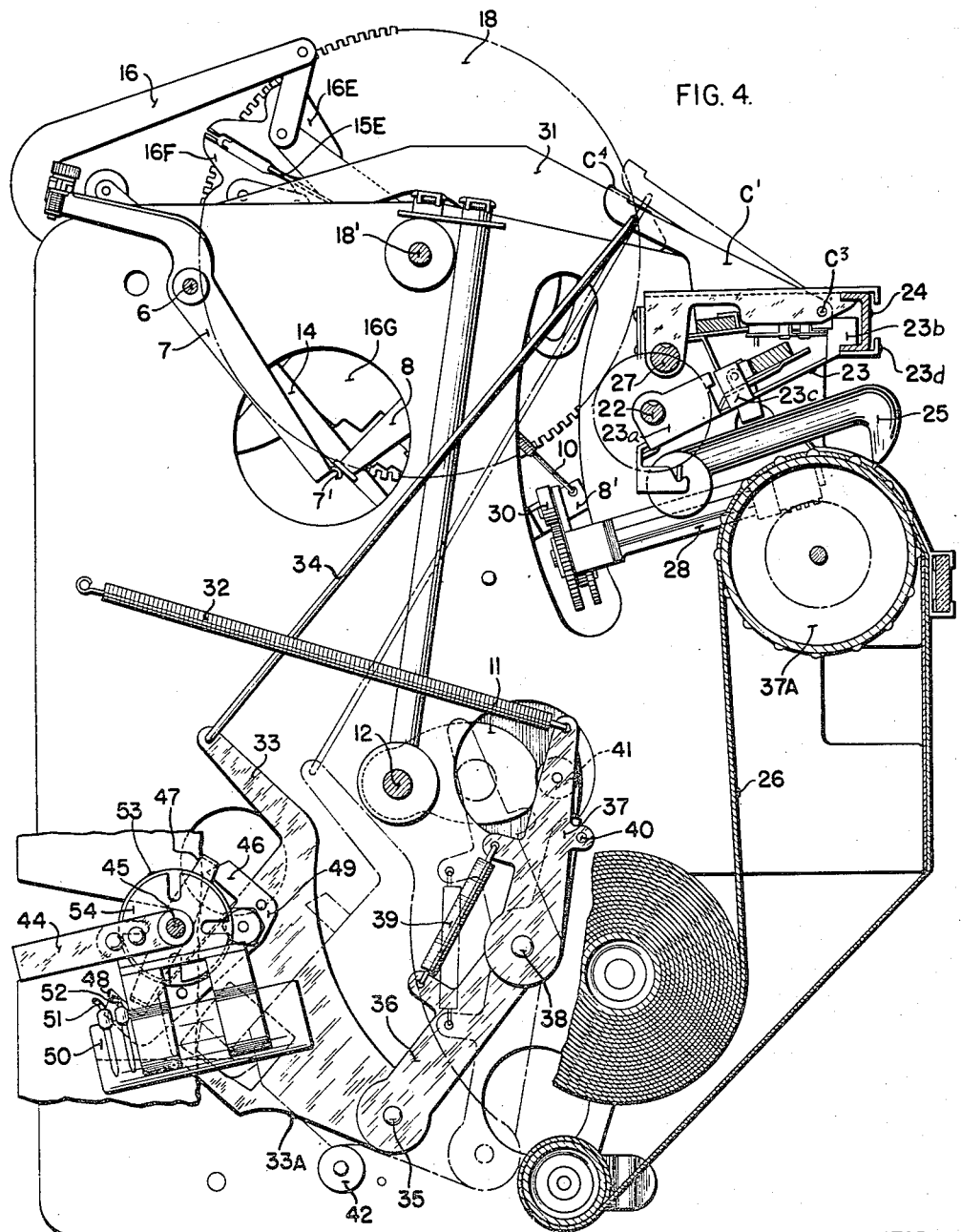
Fig. 4 is a view of the reverse side of the side plate of Figure 3.

When the parts are in the positions shown in dotted lines in Fig. 4, the lower cam edge 33A of the member 33 rests upon a roller support 42 mounted on the instrument framework, and the position of the member 33 is then such that the link 34 holds the part C' and thereby the bar C and control table part $a$ in their uppermost positions. When the lever part 36 is turned in the clockwise direction from its Fig. 4 dotted line position, the weight of the part 33 adds to the gravital tendency of the bar C and table part $a$ to turn downward, and the parts last mentioned then move downward into the position shown in full lines in Fig. 4, unless such movement is prevented by the control table latch D, or by the engagement of one of the steps on part $a^5$ with the recorder carriage shoulder 23C.

The movement of the member 33 into the full line position shown in Fig. 4 moves a control switch 50 into its closed position, unless the switch is already in that position, by turning the switch supporting frame 44 about its stationary supporting shaft 45. The frame 44 is so turned by the engagement of a projection 46 carried by the member 33 with an arm 47 carried by the frame 44. When the member 33 moves into its upper position as it will when step $a^6$ engages the roller 23c due to an increase in the quantity measured, a projection 48 carried by the member 33 engages the lower end of the arm 47 carried by the frame 44 and turns the latter to move the switch 50 into its open position if not already in that position. The projections 46 and 48 are formed by the leg portions of a yoke-shaped piece 49 of sheet metal detachably secured to the member 33.

The switch 50 as shown is a mercury switch comprising a container with terminals 51 and 52 extending into the container adjacent one of its ends. The terminals are or are not connected by a body of mercury within the container, accordingly as the position of the latter is such as to hold the mercury at one end or the other of the container. The switch 50 is clamped to its supporting member 44 which is of yoke form and has its ends pivotally mounted on a stationary shaft 45. The latter carries a friction disc 53 cooperating with a friction disc 54 carried by the frame 44 to frictionally hold the frame 44 in any position into which it is adjusted.

The above described operations show how a switch may be moved to different positions dependent upon the relative positions of the control table A and pen carriage 23. If the control table is so adjusted along its path of travel that the vertical edge between steps $a^6$ and $a^7$ on the part $a$ is at a position corresponding to the desired value of the condition being controlled the switch 50 will be closed whenever the value of the condition, as indicated by the position of the pen carriage, is lower than the desired value. In a like manner when the value of the condition is above the desired value the switch 50 will be opened. This may be termed the ordinary on-off type of control.

In order to obtain an anticipating type of control it is necessary to inject into the above described type of control an operation that is responsive to the trend of the condition. This may be accomplished in the following manner.

It will be remembered from the description above that the member 15 has three positions depending upon whether the galvanometer pointer is at its neutral position or to the right or left thereof. If the value of the condition is rising the pointer 2' deflects to the left in Figure 1 and the secondary pointer 14 engages step 15A of the member 15, holding that member in its most counter-clockwise or dotted line position of Figure 3. In the event that the value of the condition being measured is falling the galvanometer pointer is moved to the right in Fig. 1 and the secondary pointer 14 will engage the step 15C of the member 15. This will permit 15 to be positioned clockwise of the full line position of Fig. 3.

Attached to member 15 and movable therewith is an arm 55, the position of which is also an indication of the trend of the condition. This arm is used to change the position of the lever 31 that is pivoted at 31A on the side plate of the instrument and has a gravity bias in a counterclockwise direction in Fig. 3. The lever 31 has a pin 56 that is in engagement with the arm 55 and therefore has three positions, corresponding to those of the member 15. Lever 31 extends forwardly, over the shaft 18', and has its front end in the path of edge $C^4$ on arm $C^1$. The relation of lever 31 and arm C' is such that if the condition is rising the lever 31 holds the arm C' in its uppermost position as shown in dotted lines in Fig. 3, and thereby, regardless of the value of the condition, causes the member 33 on its next movement to the left in Fig. 4 to open the switch 50 by means of engagement of edge 48 and arm 47. If the value of the condition is stationary lever 31 will assume the solid line position of Fig. 3 and if the condition is falling lever 31 will be moved to a position counter-clockwise of the full line position. In the latter two cases the arm C' is free to move any position dictated by the relative positions of the control table and pen carriage.

Therefore if the value of the condition is stationary or falling the switch 50 will be operated in accordance with the magnitude of the condition, namely, switch 50 will be open if the condition is above normal and will be closed if the condition is below normal. If the condition is rising the switch 50 will be kept open regardless of the magnitude of the condition, by the lever 31 holding arm C' and its elevated position.

Figure 5:
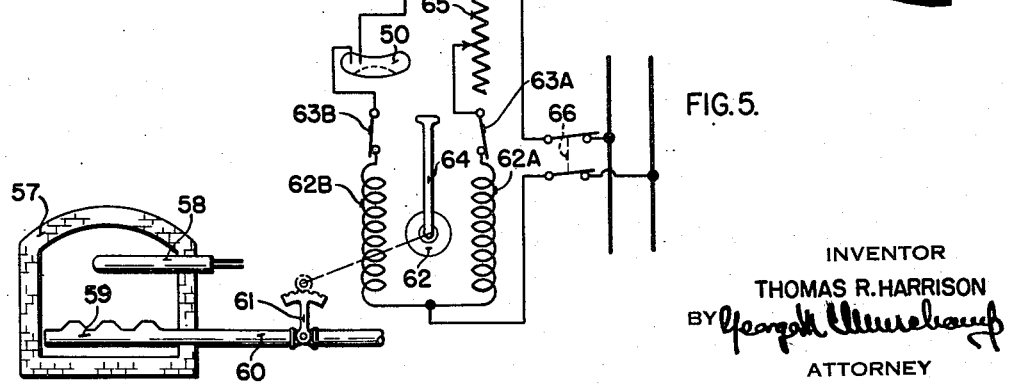
Fig. 5 is a wiring diagram of the circuit to a valve operating motor.

Referring now to Fig. 5, there is shown, by way of an example, a furnace 57 having a thermocouple 58 inserted therein which may be connected to any suitable potentiometer circuit and the galvanometer 2 to cause a deflection of the galvanometer in response to changes in furnace temperature. The furnace is heated by a burner 59 supplied with fuel through a pipe 60 having a motor operated valve 61 therein. The valve is operated through suitable gearing from a reversible motor 62.

Motor 62 has two fields 62A and 62B, the fields being connected through suitable adjustable limit switches 63A and 63B, respectively, to one side of the line. Mounted to rotate with the motor at any suitable rate with respect to the speed thereof is an arm 64 having an enlarged end to engage and open the limit switches as it moves from one end to the other of a predetermined arc.

The field 62A is at all times connected to the line, when the main switch 66 is closed, through the limit switch 63A and a variable resistance 65. The field 62B is connected to the line through the limit switch 63B, the control switch 50 and adjustable resistance 67, so that it is only energized when switch 50 is closed. The assistances 65 and 67 are so adjusted that the field 62B is stronger than field 62A, therefore when in operation the motor 62 will at all times rotate in a direction to close the valve 61 when switch 50 is open. When, however, the switch 50 is closed the field 62B is energized and the motor will rotate to open the valve 61 and supply more fuel to the burner 59.

Inasmuch as the valve is opening to increase the fuel and the heat to the furnace only when the temperature is below normal and falling, it is necessary to make the opening movement of the valve faster or more effective than its closing movement. The reason for this is that a vigorous increase in fuel supply will quickly reverse the trend of the temperature and start it rising. Thereafter the slow decrease in heat supply will permit the temperature to coast to slightly above the control point before it again begins to fall and the heat supply is again increased. The unsymmetrical control actions of a two-position switch are thereby used to insure that the trend of the position will be predominately toward the control point.

For different furnaces the rate of heat input with respect to heat output may vary and in such a case it is necessary to change the relative rates of the opening and closing speed of the fuel valve. This can be accomplished by the proper adjustment of the resistances 65 and 67. This may also be necessary in the case of different types of loads on the furnace.

For the proper operation of the system under some conditions it has been found desirable to limit the opening and closing movements of valve 61 so that a certain maximum and minimum supply of fuel is insured to prevent over or under heating of the furnace. In such a case the limit switches 63A and 63B may be adjusted relative to the arm 64, moved by the motor, so that they are opened when the valve has reached the desired limits for that particular application.

The ultimate control of furnace 57, thereof, results in increasing the fuel supply at a fast rate when the temperature thereof is below the control point and falling, and decreasing the fuel supply slowly when the temperature is rising regardless of whether it is above or below the control point. This type of control that is responsive to both the magnitude and trend of the condition permits an unsymmetrical control action with a two-position switch that insures the trend of the condition will be predominately toward the control point and that variations from the control point will be at a minimum.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a potentiometer control instrument the combination with an element deflecting in accordance with the change in value of a condition to be measured and controlled, cyclically operated means to periodically return said element toward its neutral position, a member moved by said means to a position corresponding to the value of said condition, a part successively positioned in accordance with the individual deflections of said element, control means operated in accordance with the position of said member, and means positioned by said part to interrupt the operation of said control means in accordance with the position of said member if the change of the value of said condition is in one direction and to permit operation of said control means in accordance with the position of said member if the change of the value of said condition is in another direction.

2. The method of controlling the value of a condition toward a desired point which consists of measuring the value of said condition and measuring the trend of said value and continuously applying a corrective impulse to the condition if the value is on one side of the desired value and the trend is away from the desired value and continuously removing the correction when the trend of the condition is toward the desired value.

3. The method of controlling the value of a condition toward a desired value which comprises measuring the value of the condition and measuring the trend of said value, applying a corrective impulse to the condition in one sense if the value is to one side of the desired value and the trend is either toward or away from the desired value or the value is to the other side of the desired value and the trend is toward the desired value and applying an over-corrective impulse in an opposite sense if the value is on the other side of the desired value and the trend of the condition is away from the desired value.

4. In a device for controlling a two position controlling mechanism, means responsive to the magnitude of the condition for adjusting said mechanism to one of said positions in response to a departure of the condition value from a predetermined value in one direction irrespective of the trend of said condition, and for adjusting said mechanism to the other of said positions in response to a departure of the condition value from said predetermined value in the opposite direction and means responsive to the trend of said condition to adjust said mechanism to said one position when the condition departure is in said opposite direction and is returning toward said value.

5. In a potentiometric control instrument the combination of a potentiometer measuring means including a galvanometer deflecting in response to potentiometer unbalance and a member deflecting in accordance with the value of the quantity measured, of a periodically moving element, an actuating device adjustably mounted on said element, means for adjusting said device relative to said element to one position in response to a deflection of said galvanometer in one sense regardless of the position of said member and to a second position in joint response to a deflection of said galvanometer in a second sense and a given position of said member, and control mechanism adjusted by said element in selective accordance with the adjustment of said device.

6. In a control instrument comprising measuring apparatus including a potentiometer and a galvanometer giving a quantity measuring deflection which is a measure of the difference between the value of the quantity measured at any instant, and the value of that quantity which is then indicated by the adjustment of the potentiometer, means controlled by the galvanometer for automatically rebalancing the potentiometer at intervals to bring the adjustment of the latter into correspondence with the value of said quantity at the time of each rebalancing operation, and control provisions dependent for operation in one sense upon a given deflection of said galvanometer and a given adjustment of the potentiometer, and for operation in another sense upon an opposite deflection of the galvanometer and any adjustment of the potentiometer.

7. In a control instrument, a control valve, a motor to operate said valve, a part movable to a position responsive to the trend of a condition regulated by said valve, a member movable to a position dependent upon the value of said condition, means operative to energize said valve motor for rotation in a direction to close the valve when the part and member are so positioned to indicate that the condition is above normal or when the condition is below normal and rising and operative to open said valve when said part and member are so positioned to indicate that the condition is below normal and falling.

8. The method of controlling the value of a variable condition which comprises continuously adjusting a condition controlling medium in a diminishing direction when the condition is above normal and when the condition is below normal and rising, and continuously adjusting the medium in an increasing direction when the condition is below normal and falling.

THOMAS R. HARRISON.